United States Patent [19]

Millgard

[11] Patent Number: 6,023,665
[45] Date of Patent: Feb. 8, 2000

[54] AIRCRAFT IDENTIFICATION AND DOCKING GUIDANCE SYSTEMS

[75] Inventor: Lars Millgard, Ostersund, Sweden

[73] Assignee: Airport Technology in Scandinavia AB, Froson, Sweden

[21] Appl. No.: 08/817,368

[22] PCT Filed: Oct. 14, 1994

[86] PCT No.: PCT/SE94/00968

§ 371 Date: Jul. 17, 1997

§ 102(e) Date: Jul. 17, 1997

[87] PCT Pub. No.: WO96/12265

PCT Pub. Date: Apr. 25, 1996

[51] Int. Cl.[7] .................................................. G06F 9/62
[52] U.S. Cl. .................. 702/151; 702/152; 702/159; 382/104; 382/216; 340/958; 356/3.14
[58] Field of Search ............................. 364/561; 356/28, 356/5.07, 3.14; 342/67, 27, 357, 386; 340/583, 936, 962, 958; 382/104, 216, 217; 702/94, 95, 151–159

[56] References Cited

U.S. PATENT DOCUMENTS

| 4,319,332 | 3/1982 | Mehnert . | |
|---|---|---|---|
| 4,995,102 | 2/1991 | Ichinose et al. | 342/158 |
| 5,424,746 | 6/1995 | Schwab et al. | 342/49 |
| 5,475,370 | 12/1995 | Stern | 340/583 |
| 5,589,822 | 12/1996 | Stern | 340/583 |
| 5,675,661 | 10/1997 | Richman et al. | 382/104 |

FOREIGN PATENT DOCUMENTS

| 0035101 | 9/1981 | European Pat. Off. . |
| 188757 | 7/1986 | European Pat. Off. . |
| 4009668 | 10/1991 | Germany . |
| 4301637 | 8/1994 | Germany . |
| WO 9313104 | 7/1993 | WIPO . |
| WO 9315416 | 8/1993 | WIPO . |

OTHER PUBLICATIONS

Database WPI, Section EI, Week 9332, Derwent Publications, Ltd., London, GB, Class S02, AN 93–256658, Aug. 7, 1992 (Abstract).

Database WPI, Section EI, Week 9514, Derwent Publications, Ltd., London, GB, Class T04, AN 95–105467, Dec. 13, 1994 (Abstract).

*Primary Examiner*—Kamini Shah
*Attorney, Agent, or Firm*—Blank Rome Comisky & McCauley LLP

[57] ABSTRACT

A system for detecting, identifying and docking aircraft using laser pulses to obtain a profile of an object in the distance. The system initially scans the area in front of the gate until it locates and identifies an object. Once the identity of the object is known, the system tracks the object. By using the information from the profile, the system can in real time display the type of airplane, the distance from the stopping point and the lateral position of the airplane.

23 Claims, 8 Drawing Sheets

AIRCRAFT IDENTIFICATION AND DOCKING GUIDANCE SYSTEMS

BACKGROUND OF THE INVENTION

1. Field of the Invention

This invention relates to systems for locating, identifying and tracking objects. More particularly, it relates to aircraft location, identification and docking guidance systems and to ground traffic control methods for locating and identifying objects on an airfield and for safely and efficiently docking aircraft at such airport.

2. Description Of Related Art

In recent years there has been a significantly increased amount of passengers cargo and other aircraft traffic including take offs, landings and other aircraft ground traffic. Also there has been a marked increase in the number of ground support vehicles which are required to off load cargo, provide catering services and on going maintenance and support of all aircraft. With this substantial increase in ground traffic has come a need for greater control and safety in the docking and identification of aircraft on an airfield.

Examplary of prior art systems which have been proposed for detecting the presence of aircraft and other traffic on an airfield are those systems disclosed in U.S. Pat. No. 4,995, 102; European Pat. No. 188 757; and PCT Published Applications WO 93/13104 and WO 931/5416.

However, none of those systems have been found to be satisfactory for detection of the presence of aircraft on an airfield, particularly, under adverse climatic conditions causing diminished visibility such as encountered under fog, snow or sleet conditions. Furthermore, none of the systems disclosed in the prior references are capable of identifying and verifying the specific configuration of an approaching aircraft. Still further, none of the prior systems provide adequate techniques for tracking and docking an aircraft at a designated stopping point such as an airport loading gate. Also, none of the prior systems have provided techniques which enable adequate calibration of the instrumentation therein.

Thus, it has been a continuing problem to provide systems which are sufficiently safe and reliable over a wide range of atmospheric conditions to enable detection of objects such as aircraft and other ground traffic on an airfield.

In addition, there has been a long standing need for systems which are not only capable of detecting objects such as aircraft, but which also provide for the effective identification of the detected object and verification of the identity, of such object, for example, a detected aircraft with the necessary degree of certainty regardless of prevailing weather conditions and magnitude of ground traffic.

There has also been a long standing, unfulfilled need for systems which are capable of accurately and efficiently tracking and guiding objects such as incoming aircraft to a suitable stopping point such as an airport loading gate. In addition, the provision of accurate and effective calibration techniques for such systems has been a continuing problem requiring resolution.

SUMMARY OF THE INVENTION

In order to overcome the foregoing problems, systems and methods are required which are capable of achieving accurate, safe, efficient and cost effective location of objects such as aircraft on an airfield and for proper identification and verification of the identity of such objects. In addition, systems and methods are required for tracking and docking guidance of objects such as aircraft, particularly, in a real time operating mode. Furthermore, systems and methods are required for calibration of such operating systems.

Accordingly, it is a primary object of the present invention to provide such systems and methods. In this regard, it is a specific object of the present invention to provide docking guidance systems which are capable of determining the precise position as well as verifying the identity of aircraft on an airfield. Another object of the invention is to provide information to an individual or individuals controlling the docking or parking of aircraft on an airfield via a display unit utilizing communications between the system and a personal computer and other methods for monitoring the overall method operation.

A further object is to provide the safety of digitally precise docking control and, also, to provide for implementation of such control in an extremely cost effect manner.

A still further object is to provide for the display of aircraft docking information for use by a pilot, co-pilot or other personnel docking an aircraft including information concerning the closing rate distance from an appropriate stopping point for the aircraft. Another significant object is to provide for the automatic comparison and determination that the aircraft positioning and incoming direction does not deviate from the appropriate path necessary for the particular type of aircraft being docked and particularly, to provide visual feedback as to the closing distance in a countdown format from a display, positioned forward of the aircraft which contains the distance for docking position to left or right of appropriate center line for docking and a check of the aircraft type.

Yet another object is to provide systems which not only provide azimuth guidance to either the pilot or the co-pilot, but also provide for scannings of the apron to enable appropriate and safe docking of an aircraft. Another object is to provide systems which are particularly sensitive so that accurate parking positions are achieved within extremely minimal tolerances.

A further object is to provide systems which ate extremely flexible and allow for the implementation of new operational parameters such as adding new aircraft types, alternate or secondary parking stop positions and other related information in regard to identifying, guiding and docking aircraft on an airfield.

These and other objects of the invention are accomplished by providing systems and methods for detecting the presence of an object on an airfield employing light pulses such as laser pulses projected, for example, off of mirrors in the direction of an incoming object positioned within a capture zone on the airfield and collecting light pulses reflected off the object which indicates the presence of the object. Likewise, this technique enables the determination of the aircraft's position within the capture zone as well as the detection thereof.

The present invention also provides systems and methods for verifying the identity of the detected object which, for example, enables a determination that the correct type of aircraft is approaching the docking facility and is to be docked therein. Such verification systems and methods involve the projection of light pulses such as laser pulses in angular coordinates onto an object and collecting reflected pulses off of the object in a detection device which enables a comparison of the reflected pulses to be made with a profile corresponding to the shape of a known object in order to determine whether the detected shape corresponds to the known shape.

Furthermore, the present invention provides systems and methods for tracking incoming objects wherein light pulses such as laser pulses are projected onto an incoming object and the light reflected from the object is collected and employed in order to ascertain the position of the object relative to an imaginary axial line projecting from a predetermined docking point and to detect the distance between the object and the predetermined point for purposes of determining the location of the object.

Thus, the present invention provides for the location or capture of an approaching aircraft and for the identification or recognition of its shape within a designated capture zone or control area which is essential in initiating an aircraft docking procedure. Thereafter, in accordance with the present invention, a display is provided which enables docking of the identified aircraft in an appropriate docking area for off loading of passengers, cargo and the like.

The present invention accomplishes these features while eliminating the heretofore standard need for sensors which must be embedded in the apron of the docking areas. This results in a significant reduction not only in installation time and associated costs but, also, reduces maintenance costs thereafter. Furthermore, this invention permits retrofitting of the present systems into existing systems without requiring apron construction and the accompanying interruption in use of the airport docking areas which has been required with prior devices previously used for docking guidance systems.

In preferred embodiments of the systems of the present invention, a pilot bringing an aircraft into a gate at an airport is provided with a real time display mounted, for example, above the gate which indicates the aircraft's position relative to the point where the pilot must start to brake the plane. Also displayed is the aircraft's lateral position compared to a predetermined line for a plane of its type to follow in order to most expeditiously arrive at the gate.

The software employed in the systems of the present invention preferably comprises four modules which perform the main computational tasks of the system and control the hardware. These modules include one for capture, one for identification, one for tracking and one for calibration of the system.

In a preferred embodiment of this invention, the capture module is employed to direct the devices for projecting light pulses to scan the area in front of a docking gate. Thus, when mirrors are employed to reflect and project pulses such as laser pulses, the capture module continues to direct the laser to scan this area until it detects an object entering the area. Once it detects an object, the capture module computes the distance and the angular position of the object and passes control onto the tracking module.

Once activated, the tracking module follows the incoming aircraft to the gate while providing information about its lateral location and distance relative to the desired stopping point. Using this information, the pilot can correct the course of the plane and brake at the precise point that will result in stopping the aircraft in a desired docking position in alignment with the gate. During the tracking, an identification module first scans the detected object to determine if its profile matches the reference profile of the type of aircraft expected. If the profiles do not match, the system informs the airport tower and a signal is transmitted for stopping the docking function.

Finally the calibration module calibrates the distance and angular measurements to ensure that the readings of the detection devices such as a Laser Range Finder accurately correspond to the distance and angle of the aircraft. This module runs periodically during the capture and tracking modules to determine the continued accuracy of the system.

BRIEF DESCRIPTION OF THE DRAWINGS

The features and advantages of the invention will become apparent from the following detailed description taken in connection with the accompanying drawings wherein.

Table I is a preferred embodiment of a Horizontal Reference Profile Table which is employed to establish the identity of an aircraft in the systems of the present invention:

Table II is a preferred embodiment of a Comparison Table which is employed in the systems of the present invention for purposes of effectively and efficiently docking an aircraft;

DETAILED DESCRIPTION OF THE PREFERRED EMBODIMENTS

Reference is now made to FIGS. 1–10 and Tables I–II, in which like numerals designate like elements throughout the several views. Throughout the following detailed description, numbered stages depicted in the illustrated flow diagrams are generally indicated by element numbers in parenthesis following such references.

Figure 1:
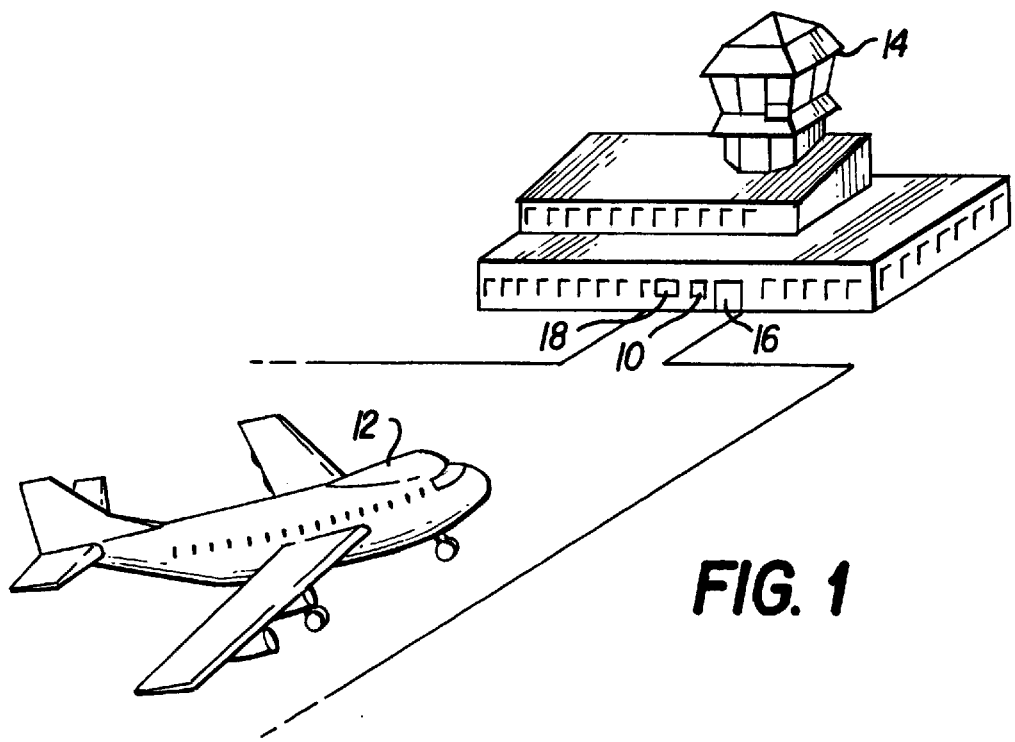
FIG. 1 is a view illustrating the system as in use at an airport.

Referring to FIG. 1, the systems of the present invention generally designated 10 in the drawings provide for the computerized location of an object, verification of the identity of the object and tracking of the object, the object preferably being an aircraft 12. In operation, once the control tower 14 lands an aircraft 12, it informs the system that a plane is approaching the gate 16 and the type of aircraft (i.e., 747, L-1011, etc.) expected. The system 10 then scans the area in front of the gate 16 until it locates an object that it identifies as an airplane 12. The system 10 then compares the profile of the aircraft 12 with a reference profile for the expected type of aircraft. If the located aircraft does not match the expected profile, the system informs or signals the tower 14 and shuts down.

If the object is the expected aircraft 12, the system 10 tracks it into the gate 16 by displaying in real time to the pilot the distance remaining to the proper stopping point 29 and the lateral position 31 of the plane 12. The lateral position 31 of the plane 12 is provided on a display 18 allowing the pilot to correct the position of the plane to approach the gate 16 from the correct angle. Once the airplane 12 is at its stopping point 53, this fact is shown on tile display 18 and the pilot stops the plane. Employing the system 10 of the present invention, it should be noted that once the plane 12 comes to rest, it is accurately aligned with the gate 16 requiring no adjustment of the gate 16 by the ground staff.

Figure 2:
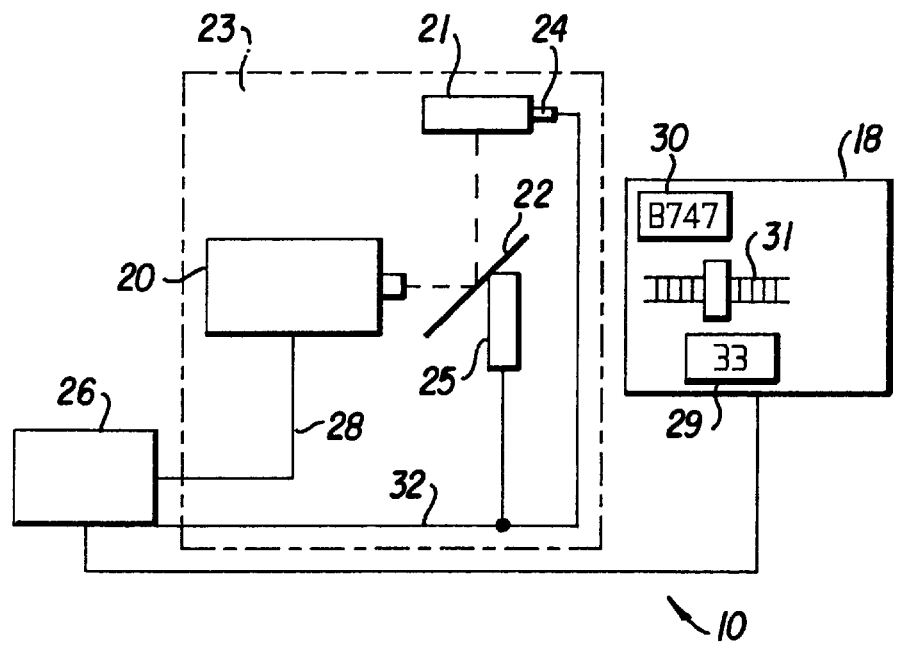
FIG. 2 is a diagrammatic view illustrating the general componentry of a preferred system in accordance with the present invention.

Referring to FIG. 2, the system 10 consists of a Laser Range Finder (LRF) 20, two mirrors 21, 22, a display unit 18, two step motors 24, 25, and a microprocessor 26. Suitable LRF products for use herein are sold by Laser Atlanta Corporation and are capable of emitting laser pulses and receiving the reflections of those pulses reflected off of distant objects and computing the distance to those objects.

The system 10 is arranged such that there is a connection 28 between the serial port of the LRF 20 and the microprocessor 26. Through this connection, the LRF 20 sends measurement data approximately every $\frac{1}{400}$ th of a second to the microprocessor 26. The hardware components generally designated 73 of the system 10 are controlled by the programmed microprocessor 26. In addition, the microprosessor 26 feeds data to the display 18. As the interface to the pilot, the display unit 18 is placed above the gate 16 to show the pilot how far the plane is from its stopping point 29 the type of aircraft 30 the system believes is approaching and the lateral location of the plane 31. Using this display, the pilot can adjust the approach of the plane 12 to the gate 16 to ensure the plane is on the correct angle to reach the gate. If the display 18 is showing the wrong aircraft type 30, the pilot can abort the approach before any damage is done. This double check ensures the safety of the passengers, plane and airport facilities because if the system tries to maneuver a larger 747 as if it was a 737, it likely will cause extensive damage.

In addition to the display 18, the microprocessor 26 processes the data from the LRF 20 and controls the direction of the laser 20 through its connection 32 to the step motors 24, 25. The step motors 24, 25 are connected to the mirrors 21, 22 and move them in response to instructions from the microprocessor 26. Thus, by controlling the step motors 24, 25, the microprocessor 26 can change the angle of the mirrors 21, 22 and aim the laser pulses from the LRF 20.

The mirrors 21,22 aim the laser by reflecting the laser pulses outward over the tarmac of the airport. In the preferred embodiment, the LRF 20 does not move. The scanning by the laser is done with mirrors. One mirror 22 controls the horizontal angle of the laser while the other mirror 21 controls the vertical angle. By activating the step motors 24, 25, the microprocessor 26 controls the angle of the mirrors and thus the direction of the laser pulse.

The system 10 controls die horizontal mirror 22 to achieve a continuous horizontal scanning within a ±10 degree angle in approximately 0.1 degree angular steps which are equivalent to 16 microsteps per step with the Escap EDM-453 step motor. One angular step is taken for each reply from the reading unit, i.e., approximately every 2.5 ms. The vertical mirror 21 can be controlled to achieve a vertical scan between +20 and −30 degrees in approximately 0.1 degree angular steps with one step every 2.5 ms. The vertical mirror 21 is used to scan vertically when the nose height is being determined and when the aircraft 12 is being identified. During the tracking mode, the vertical mirror 21 is continuously adjusted to keep the horizontal scan tracking the nose tip of the aircraft 12.

Figure 3:
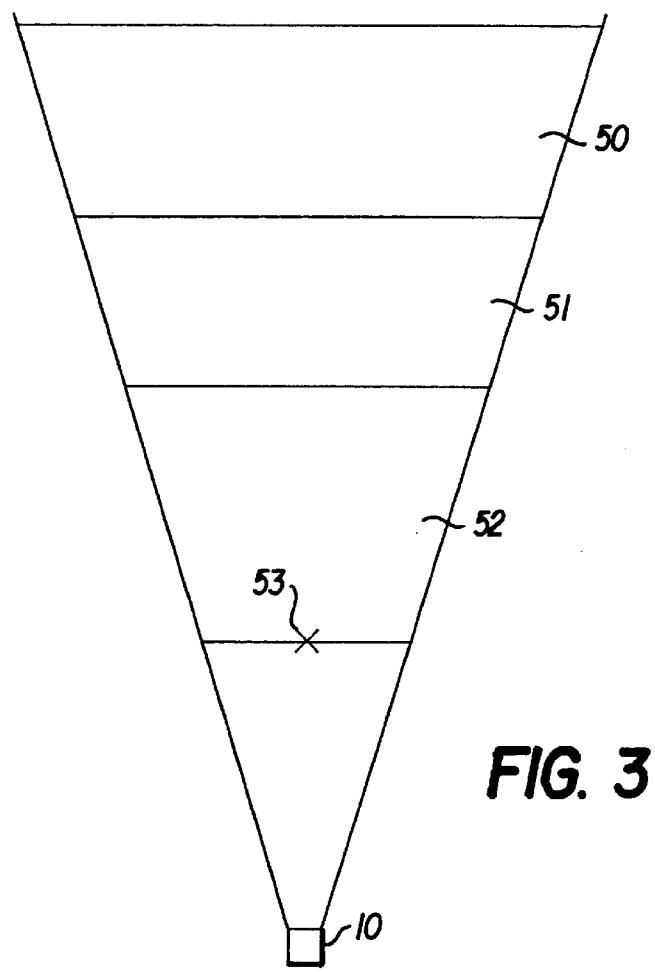
FIG. 3 is a top plan view illustrating the detection area in front of a docking gate which is established for purposes of detection and identification of approaching aircraft.

Referring to FIG. 3, the system 10 divides the field in front of it by distance into three parts. The farthest section, from about 50 meters out, is the capture zone 50. In this zone 50, the system 10 detects the aircraft's nose and makes a rough estimate of lateral and longitudinal position of the aircraft 12. Inside the capture zone 50 is the identification area 51. In this area, the system 10 checks the profile of the aircraft 12 against a stored profile. The system 10 shows the lateral position of the aircraft 12 in this region, related to a predetermined line, on the display 18. Finally, nearest to the LPF 20 is the display or tracking area 52. In the display area 52, the system 10 displays the lateral and longitudinal position of the aircraft 12 relative to the correct stopping position with its highest degree of accuracy. At the end of the display area 52 is the stopping point 53. At the stopping point 53, the aircraft will be in the correct position at the gate 16.

In addition to the hardware and software, the system 10 maintains a database containing reference profiles for any type of aircraft it might encounter. Within this database, the system stores the profile for each aircraft type as a horizontal and vertical profile reflecting the expected echo pattern for that type of aircraft.

Referring to Table I, the system maintains the horizontal profile in the form of a Table I whose rows 40 are indexed by angular step and whose columns 41 are indexed by distance from the stopping position for that type of aircraft. In addition to the indexed rows, the table contains a row 42 providing the vertical angle to the nose of the plane at each distance from the LRF, a row 44 providing the form factor, k, for the profile and a row 45 providing the number of profile values for each profile distance. The body 43 of the Table I contains expected distances for that type of aircraft at various scanning angles and distances from the stopping point 53.

Theoretically, the 50 angular steps and the 50 distances to the stopping point 53 would require a Table I containing 50×50, or 2500, entries. However, the Table I will actually contain far fewer entries because the profile will not expect a return from all angles at all distances. It is expected that a typical table will actually contain between 500 and 1000 values. Well known programming techniques provide methods of maintaining a partially full table without using the memory required by a full table.

In addition to the horizontal profile, the system 10 maintains a vertical profile of each type of aircraft. This profile is stored in the same manner as the horizontal profile except its rows are indexed by angular steps in the vertical direction and its column index contains fewer distances from the stopping position than the horizontal profile. The vertical profile requires fewer columns because it is used only for identifying the aircraft 12 and for determining its nose height, which take place at a defined range of distances from the LRF 20 in the identification area 51. Consequently, the vertical profile stores only the expected echoes in that range without wasting data storage space on unneeded values.

Figure 4:
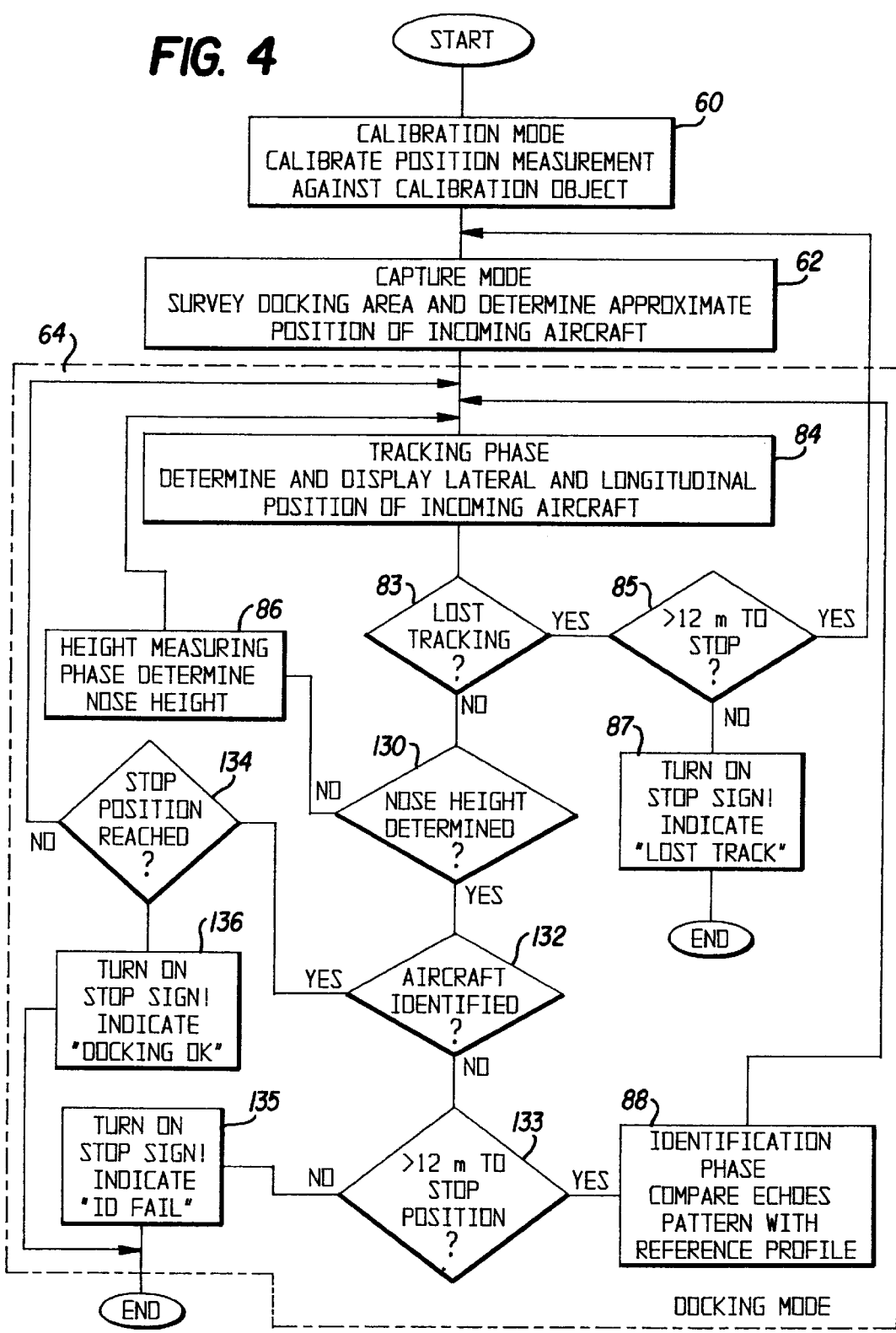
FIG. 4 is a flow chart illustrating the main routine and the docking mode of the system.

The system 10 uses the previously described hardware and database to locate, identify and track aircraft using the following procedures:

Referring to FIG. 4, the software running on the microprocessor performs a main routine containing subroutines for the calibration mode 60, capture mode 62 and docking mode 64. The microprocessor first performs the calibration mode 60, then the capture mode 62 and then the docking mode 64. Once the aircraft 12 is docked, the program finishes. These modes are described in greater detail as follows:

Calibration Mode

Figure 5:
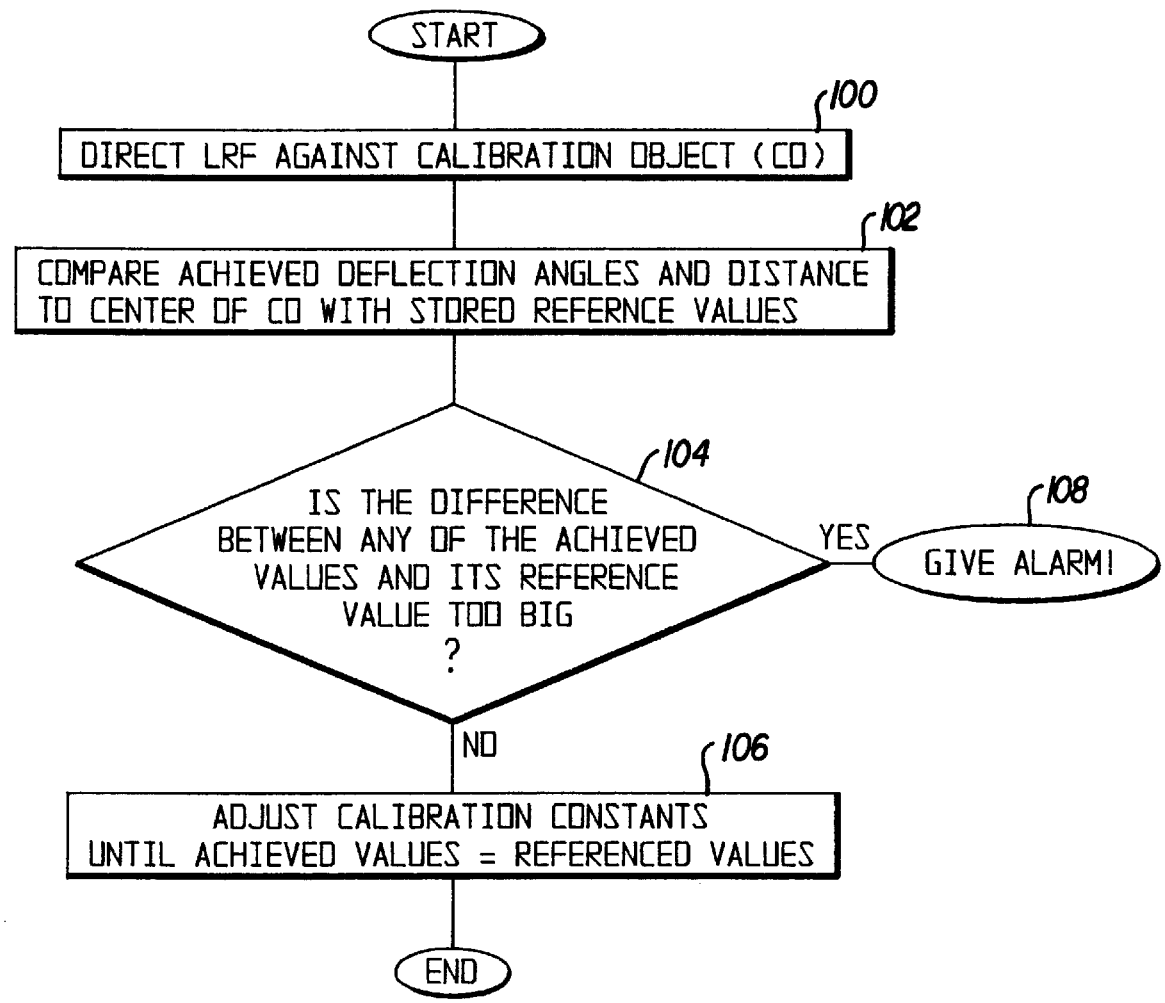
FIG. 5 is a flow chart illustrating the calibration mode of the system.
Figure 7:
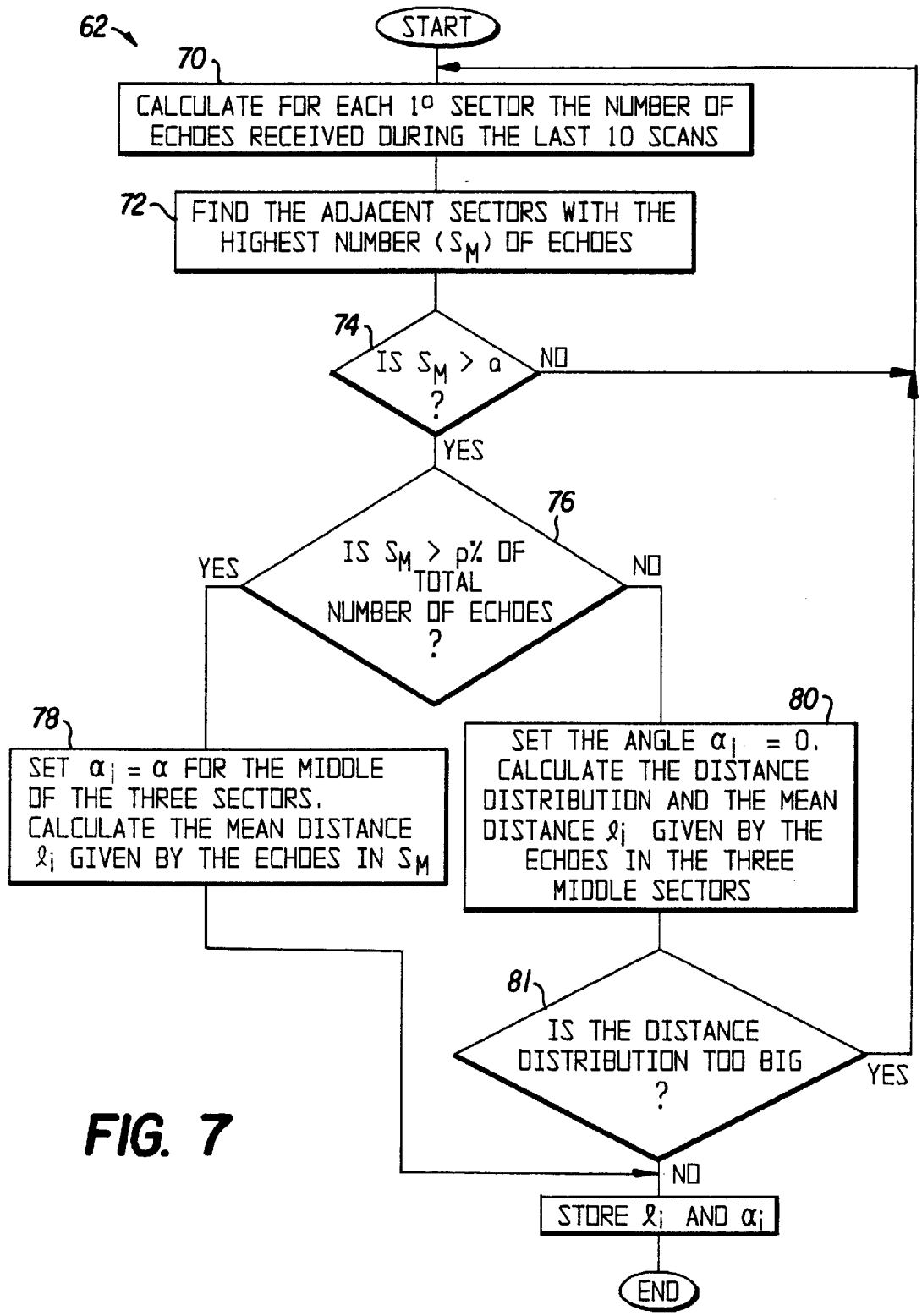
FIG. 7 is a flow chart illustrating the capture mode of the system.

To ensure system accuracy, the microprocessor 26 is programmed to calibrate itself in accordance with the procedure illustrated in FIG. 5 before capturing an aircraft 12 and at various intervals during tracking. Calibrating the system 10 ensures that the relationship between the step motors 24, 25 and the aiming direction is known. The length measuring ability of the LRF 20 is also checked.

Figure 6:
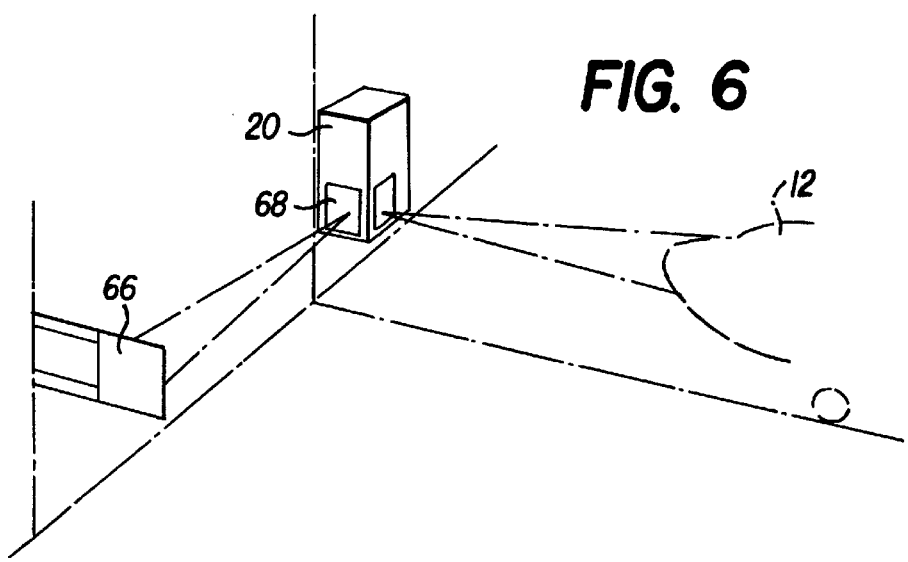
FIG. 6 is a view illustrating the components of the calibration mode.

Referring to FIG. 6, for calibration, the system 10 uses a square plate 66 with a known position. The plate 66 is mounted 6 meters from the LRF 20 and at the same height as the LRF 20.

To calibrate, the system sets (a,β) to (0,0) causing the laser to be directed straight forward. The vertical mirror 22 is then tilted such that the laser beam is directed backwards to a rear or extra mirror 68 which redirects the beam to the calibration plate 66. (100) The microprocessor 26 then uses the step motors 24, 25 to move the mirrors 21, 22 until it finds the center of the calibration plate 66. Once it finds the center of the calibration plate 66, the microprocessor 26 stores the angles $(\alpha_{cp}, \beta_{cp})$ at that point and compares them to stored expected angles. (102) The system 10 also compares the reported distance to the plate 66 center with a stored expected value. (102) If the reported values do not match the stored values, the microprocessor 26 changes the calibration constants, which determine the expected values, until they do. (104, 106) However, if any of these values deviate too much from the values stored at installation, an alarm is given. (108)

Capture Mode

Initially, the airport tower 14 notifies the system 10 to expect an incoming airplane 12 and the type of airplane to expect. This signal puts the software into a capture mode 62 as outlined in FIG. 8. In capture mode 62, the microprocessor 26 uses the step motors 24, 25 to direct the laser to scan the capture zone 50 horizontally for the plane 12. This horizontal scan is done at a vertical angle corresponding to the height of the nose of the expected type of aircraft at the midpoint of the capture zone 50.

To determine the correct height to scan, the microprocessor 26 computes the vertical angle for the laser pulse as:

$$\beta_r = \arctan[(H-h)/l_f]$$

where H=the height of the LRF 20 above the ground, h=the nose height of the expected aircraft, and $l_f$=the distance from the LRF 20 to the middle of the capture zone 50. This equation results in a vertical angle for the mirror 21 that will enable the search to be at the correct height at the middle of the capture zone 50 for the expected airplane 12. Alternatively, the system 10 can store in the database values for $\beta_r$ for different types of aircraft at a certain distance. However, storing $\beta_r$ limits the flexibility of the system 10 because it can capture an aircraft 12 only at a single distance from the LRF 20.

In the capture zone 50 and using this vertical angle, the microprocessor 26 directs the laser to scan horizontally in pulses approximately 0.1 degree apart. The microprocessor 26 scans horizontally by varying α, the horizontal angle from a center line starting from the LRF 20, between $\pm\alpha_{max}$, a value defined at installation. Typically, $\alpha_{max}$ is set to 50 which, using 0.1 degree pulses, is equivalent to 5 degrees and results in a 10 degree scan.

The release of the laser pulses results in echoes or reflections from objects in the capture zone 50. The detection device of the LRF 20 captures the reflected pulses, computes the distance to the object from the time between pulse transmission and receipt of the echo, and sends the calculated distance value for each echo to the microprocessor 26. The micro processor 26 stores, in separate registers in a data storage device, the total number of echoes or hits in each 1 degree sector of the capture zone 50. (70) Because the pulses are generated in 0.1 degree intervals, up to ten echoes can occur in each sector. The microprocessor 26 stores these hits in variables entitled so where α varies from 1 to 10 to reflect each one degree slice of the ten degree capture zone 50.

In addition to storing the number of hits per sector, the microprocessor 26 stores, again in a data storage device, the distance from the LRF 20 to the object for each hit or echo. Storing the distance to each reflection requires a storage medium large enough to store up to ten hits in each 1 degree of the capture zone 50 or up to 100 possible values. Because, in many cases, most of the entries will be empty, well known programming techniques can reduce these storage requirements below having 100 registers always allocated for these values.

Once this data is available for a scan, the microprocessor 26 computes the total number of echoes, $S_T$, in the scan by summing the $s_\alpha$'s. The microprocessor 26 then computes $S_M$, the largest sum of echoes in three adjacent sectors. (72) In other words, $S_M$ is the largest sum of $(S_{\alpha-1}, S_\alpha, S_{\alpha+1})$.

Once it computes $S_M$ and $S_T$, the microprocessor 26 determines whether the echoes are from an incoming airplane 12. If $S_M$ is not greater than 24, no airplane 12 has been found and the microprocessor 26 returns to the beginning of the capture mode 62. If the largest sum of echoes, $S_M$ is greater than 24 (74), a "possible" airplane 12 has been located. If a "possible" airplane 12 has been located, the microprocessor checks if $S_M/S_T$ is greater than 0.5 (76), or the three adjacent sectors with the largest sum contain at least half of all the echoes received during the scan.

If $S_M/S_T$ is greater than 0.5, the microprocessor 26 calculates the location of the center of the echo. (78, 82) The angular location of the center of the echo is calculated as:

$$a_r = a_v + (S_{\alpha+1} - S_{\alpha-1})/(S_{\alpha-1} + S_\alpha + S_{\alpha+1})$$

where $S_\alpha$ is the $S_\alpha$ that gave $S_M$ and $a_v$ is the angular sector that corresponds to that $S_\alpha$.

The longitudinal position of the center of the echo is calculated as:

$$l_r = (1/n)_{i=1} \Sigma^{10} l_{avi}$$

where the $l_{avi}$ are the measured values, or distances to the object, for the pulses that returned an echo from the sector $a_v$ and where n is the total number of measured values in this sector. (78, 82) Because the largest possible number of measured values is ten, n must be less than or equal to ten.

However, if $S_M/S_T < 0.5$, the echoes may have been caused by snow or other aircraft at close range. If the cause is an aircraft at close range, that aircraft is probably positioned fairly close to the centerline so it is assumed that $a_r$ should be zero instead of the above calculated value and that $l_r$ should be the mean distance given by the three middle sectors. (80) If the distance distribution is too large, the microprocessor 26 has not found an airplane 12 and it returns to the beginning of the capture mode 62. (81).

After calculating the position of the aircraft 12, the system 10 switches to docking mode 64.

Docking Mode

The docking mode 64, illustrated in FIG. 4. includes three phases, the tracking phase 84, the height measuring phase 86 and the identification phase 88. In the tracking phase 84, the system 10 monitors the position of the incoming aircraft 12 and provides the pilot with information about axial location 31 and distance from the stopping point 53 of the plane through the display 18. The system 10 begins tracking the aircraft 12 by scanning horizontally.

Figure 8:
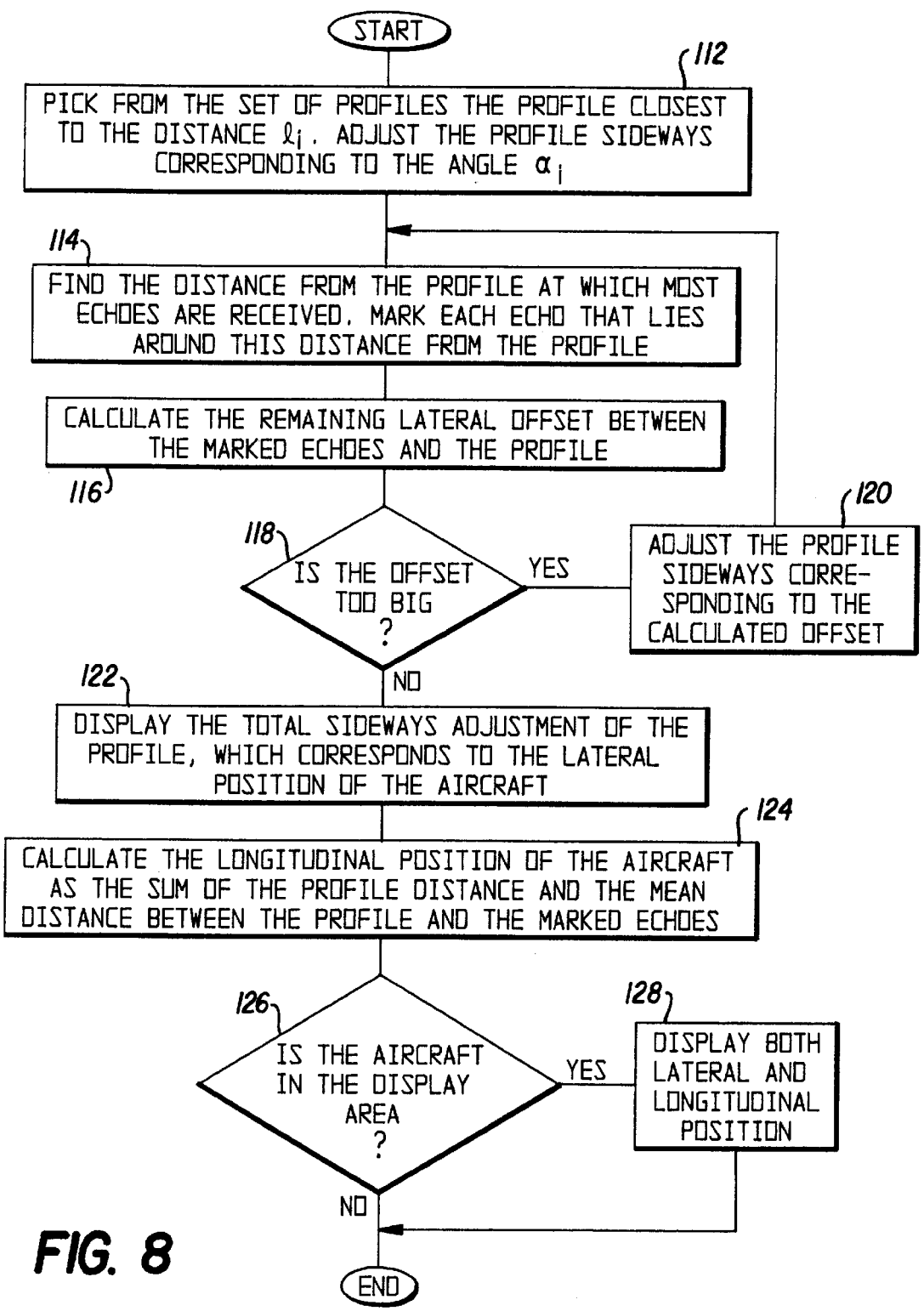
FIG. 8 is a flow chart illustrating the tracking phase of the system.

Referring to FIG. 8. during the first scan in tracking phase 84, the microprocessor 26 directs the LRF 20 to send out laser pulses in single angular steps, $\alpha$, or, preferably, at 0.1 degree intervals between:

$$(\alpha_t - \alpha_p - 10) \text{ and } (\alpha_t + \alpha_p + 10)$$

where $\alpha_t$ is determined during the capture mode 62 as the annular position of the echo center and $\alpha_p$ is the largest angular position in the current profile column that contains distance values.

After the first scan, $\alpha$ is stepped back and forth with one step per received LRF value between:

$$(\alpha_s - \alpha_p - 10) \text{ and } (\alpha_s + \alpha_p + 10)$$

where $\alpha_s$ is the angular position of the scan.

During the tracking phase 84, the vertical angle, $\beta$, is set to the level required for the identified craft 12 at its current distance from the LRF 20 which is obtained from the reference profile Table I . The current profile column is the column representing a position less than but closest to $l_r$.

The microprocessor 26 uses the distance from the stopping point 53 to find the vertical angle for the airplane's current distance on the profile Table I. During the first scan, the distance, $l_r$, calculated during the capture mode 62, determines the appropriate column of the profile Table I and thus the angle to the aircraft 12. For each subsequent scan, the microprocessor 26 uses the in the column of the profile Table I reflecting the present distance from the stopping point 53. (112)

Using the data from the scans and the data on the horizontal profile Table I, the microprocessor 26 creates a Comparison Table II . Referring to Table II the Comparison Table II is a two dimensional table with the number of the pulses, (or angular step number, as the index 91, i, to the rows. Using this index, the following information, represented as columns of the table, can he accessed for each row: $l_i$ 92, the measured distance to the object on this angular step, $l_{ki}$ 93, the measured value compensated for the skew caused by the displacement (equal to $l_i$ minus the quantity $s_m$ the total displacement during the last scan, minus the quantity i times $s_p$, the average displacement during each step in the last scan (i.e.) $l_i$-($S_m$-i$s_p$)), $d_i$ 94, the distance between the generated profile and the reference profile (equal to $r_{ij}$, the profile value for the corresponding angle at the profile distance j. minus $l_{ki}$), $a_i$, 95, the distance between the nose of the aircraft and the measuring equipment (equal to $r_{jso}$ the reference profile value at zero degrees, minus $d_i$). $a_i$ 96, the estimated nose distance after each step (equal to $a_m$, the nose distance at the end of the last scan, minus the quantity i times $s_p$), $a_d$, the difference between the estimated and measured nose distance (equal to the absolute value of $a_i$ minus $a_c$), and Note 97 which indicates the echoes that are likely caused by an aircraft.

During the first scan in the tracking phase 84, the system 10 uses the horizontal profile column representing an aircraft position, j, less than but closest to the value of $l_r$. For each new scan, the profile column whose value is less than but closest to ($a_m$-$s_m$) is chosen where $a_m$ is the last measured distance to the aircraft 12 and $s_m$ is the aircraft's displacement during the last scan. Additionally, the values of the profile are shifted sideways by $\alpha_s$ to compensate for the lateral position of the aircraft. (112)

During each scan, the microprocessor 26 also generates a Distance Distribution Table (DDT). This table contains the distribution of $a_i$ values as they appear in the Comparison Table II. Thus, the DDT has an entry representing the number of occurrences of each value of $a_i$ in the Comparison Table II in 1 meter increments between 10 to 100 meters.

After every scan, the system 10 uses the DDT to calculate the average distance, $a_m$, to the correct stopping point 53. The microprocessor 26 scans the data in the DDT to find the two adjacent entries in the DDT for which the sum of their values is the largest. The microprocessor 26 then flags the Note 97 column in the Comparison Table II for each row containing all entry for a corresponding to either of the two DDT rows having the largest sum. (114)

The system 10 then determines the lateral deviation or offset. (116) The microprocessor 26 first sets:

$$2d = \alpha_{max} - \alpha_{min}$$

where $\alpha_{max}$ and $a_{min}$ are the highest and lowest $\alpha$ values for a continuous flagged block of $d_i$ values in the Comparison Table II. Additionally, the microprocessor 26 calculates:

$$Y_1 = \Sigma d_i$$

for the upper half of the flagged $d_i$ in the block and:

$$Y2 = \Sigma d_i$$

for the lower half of the block. Using $Y_1$, and $Y_2$, "a" 116 is calculated as:

$$32 \text{ k} \times (Y_1 - Y_2)/d^2$$

where k is given in the reference profile. If "a" exceeds a given value, preferably set to one, it is assumed that there is a lateral deviation approximately equal to "a". The $l_i$ column of the Comparison Table II is then shifted "a" steps and the Comparison Table II is recalculated. This process continues until "a" is smaller than an empirically established value, preferably one. The total shift, $a_s$, of the $l_i$. column is considered equal to the lateral deviation or offset. (116) If the lateral offset is larger than a predetermined value, preferably set to one, the profile is adjusted sideways before the next scan. (118, 120)

After the lateral offset is checked, the microprocessor 26, provides the total sideways adjustment of the profile, which corresponds to the lateral position 31 of the aircraft 12, on the display 18. (122)

The microprocessor 26 next calculates the distance to the nose of the aircraft, $a_m$, as:

$$a_m = \Sigma(\text{flagged } a_i)/N$$

where N is the total number of flagged $a_i$. from $a_m$, the microprocessor 26 can calculate the distance from the plane 12 to the stopping point 53 by subtracting the distance from the LRF 20 to the stopping point 53 from the distance to the nose of the aircraft. (124)

Once it calculates of the distance to the stopping point 53 the microprocessor 26 calculates the average displacement during the last scan, $s_m$. The displacement during the last scan is calculated as:

$$S_m = a_m - a_m$$

where $a_{m-1}$ and $a_m$ belong to the last two scans. For the first scan in tracking phase 84, $S_m$ is set to 0

The average displacement $s_p$ during each step is calculated as:

$$S_{p=Sm}/p$$

where P is the total number of steps for the last scan cycle.

The microprocessor 26 will inform the pilot of the distance to the stopping position 53 by displaying it on the display unit 18, 29. By displaying the distance to the stopping position 29, 53 after each scan, the pilot receives constantly updated information in real time about how far the plane 12 is from stopping.

If the aircraft 12 is in the display area 52, both the lateral 31 and the longitudinal position 29 are provided on the display 18. (126. 128) Once the microprocessor 26 displays the position of the aircraft 12, the tracking phase ends.

Once it completes the tracking phase, the microprocessor 26 verifies that tracking has not been lost by checking that the total number of rows flagged divided by the total number of measured values, or echoes, in the last scan is greater than 0.5. (83) In other words, if more than 50% of the echoes do not correspond to the reference profile, tracking is lost. If tracking is lost and the aircraft 12 is greater than 12 meters from the stopping point, the system 10 returns to the capture mode 62. (85) If tracking is lost and the aircraft 12 is less than or equal to 12 meters from the stopping point 53 the system 10 turns on the stop sign to inform the pilot that it has lost tracking. (85, 87)

If tracking is not lost, the microprocessor 26 determines if the nose height has been determined. (130) If the height has not yet been determined the microprosessor 26 enters the height measuring phase 86. If the height has already been determined, the microprocessor 26 checks to see if the aircraft has been identified. (132)

Figure 9:
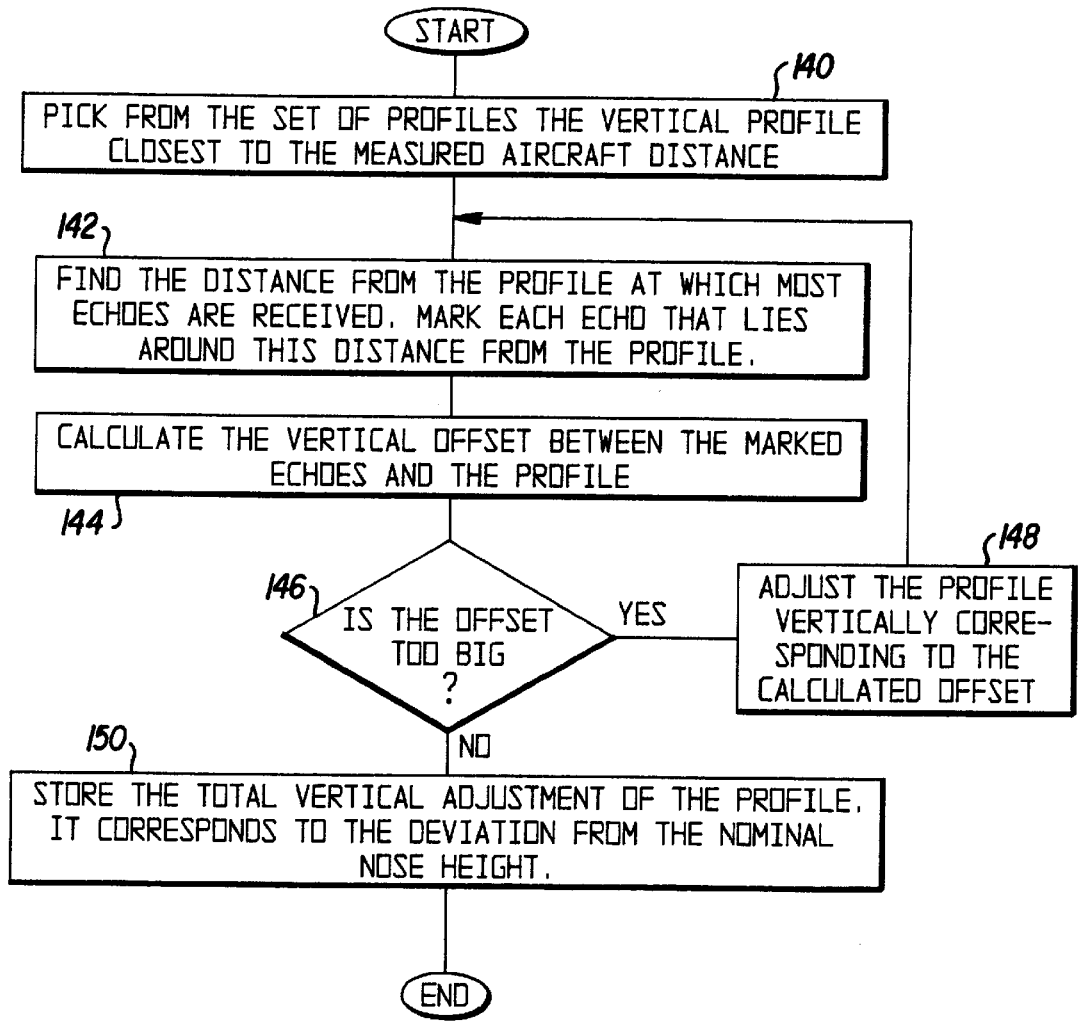
FIG. 9 is a flow chart illustrating the height measuring phase of the system.

In the height measuring phase, illustrated in FIG. 9, the microprocessor 26 determines the nose height by directing the LRF 20 to scan vertically. The nose height is used by the system to ensure that the horizontal scans are made across the tip of the nose.

To check the nose height, the microporocessor 26 sets $\beta$ to a predetermined value $\beta_{max}$ and then steps it down in 0.1 degree intervals once per received/reflected pulse until it reaches $\beta_{min}$, another predetermined value $\beta_{min}$ and $\beta_{max}$ are set during installation and typically are −20 and 30 degrees respectively. After $\beta$ reaches $\beta_{min}$ the microprocessor 26 directs the step motors 24,25 up until it reaches $\beta_{max}$. This vertical scanning is done with $\alpha$ set to $\alpha_s$, the azimuth position of the previous scan.

Using the measured aircraft distance, the microprocessor 26 selects the column in the vertical profile table closest to the measured distance. (140) Using the data from the scan and the data on the vertical profile table, the microprocessor 26 creates a Comparison Table II. Referring to FIG. 4, the Comparison Table II is a two dimensional table with the number of the pulse, or angular step number, as an index 91, i to the rows. Using this index, the following information, represented as columns of the table, can be accessed for each row: $l_i$ 92, the measured distance of the object on this angular step, $l_{ki}$ 93, the measured value compensated for the skew caused by the displacement (equal to $l_i$ minus the quantity $S_m$, the total displacement during the last scan, minus the quantity i times $S_p$, the average displacement during each stop in the last scan), $d_i$94 the distance between the generated profile and the reference profile (equal to $r_{ij}$, the profile value for the corresponding angle at the profile distance j, minus $l_{ki}$), $a_i$ 95, the distance between the nose of the aircraft and the measuring equipment equal to $t_{j\_so}$, the reference profile value at zero degrees, minus $d_j$), $a_e$96, the estimated nose distance after each step (equal to $a_m$, the nose distance at the end of the last scan, minus the quantity i times $s_p$). $a_d$, the difference between the estimated and measured nose distance (equal to the absolute value of $a_i$ minus $a_e$), and Note 97 which indicates echoes that are likely caused by an aircraft 12.

During each scan, the microprocessor 26 also generates a Distance Distribution Table (DDT). This table contains the distribution of $a_i$ values as they appear in the Comparison Table II. Thus, the DDT has an entry representing the number of occurrences of each value of $a_i$ in the Comparison Table II in 1 meter increments between 10 to 100 meters.

After every scan, the system 10 uses the DDT to calculate the average distance $a_m$, to the correct stopping point 53. The microprocessor 26 scans the data in the DDT to find the two adjacent entries in the DDT for which the sum of their values is the largest. The microprocessor 26 then flags the Note 97 column in the Comparison Table II for each row containing an entry for $a_i$ corresponding to either of the two DDT rows having the largest sum. (142)

Once it completes the calculation of the average distance to the correct stopping point 53, the microprocessor 26 calculates the average displacement during the last scan, $s_m$. The displacement during the last scan is calculated as:

$$S_m = a_{m-1} - a_m$$

where $a_{m-1}$ and $a_m$ belong to the last two scans. For the first scan in tracking phase 84, $s_m$ is set to 0. The average displacement $S_p$ during each step is calculated as $$s_p = S_m/P$$

where P is the total number of steps for the last scan cycle.

Calculating the actual nose height is done by adding the nominal nose height, predetermined height of the expected aircraft when empty, to the vertical or height deviation. Consequently, to determine the nose height the system 10 first determines the vertical or height deviation. (144) Vertical deviation is calculated by setting:

$$2d = \beta_{max} - \beta_{min}$$

where $\beta_{max}$ and $\beta_{min}$ are the highest and lowest $\beta$ value for a continuous flagged block of $d_i$ values in the Comparison Table II. Additionally, the microprocessor 26 calculates:

$$Y_1 = \Sigma d_i$$

for the upper half of the flagged $d_i$ in the block and:

$$Y_2 = \Sigma d_i$$

for the lower half of the block. Using $Y_1$ and $Y_2$, "a" is calculated as $$a = kx(Y_1 - Y_2)/d^2$$

where k is given in the reference profile. If "a" exceeds a given value, preferably one it is assumed that there is a vertical deviation approximately equal to "a". The 1 column is then shifted "a" steps, the Comparison Table II is re-screened and "a"recalculated. This process continues until "a" is smaller than the given value, preferably one. The total shift, $\beta_s$ of the $l_i$ column is considered equal to the height deviation. (144) The $\beta_i$ values in the vertical Comparison Table II are then adjusted as $\beta_i + \Delta\beta_i$ where the height deviation $\Delta\beta_i$ is:

$$\Delta\beta_i = \beta_s \times (a_{m\beta} = a_s)/(a_j = a_s)$$

and where $a_{m\beta}$ is the valid $a_m$ value when $\beta_s$ was calculated.

Once the height deviation is determined, the microprocessor 26 checks if it is bigger than a predetermined value, preferably one. (146) If the deviation is larger than that value, the microprocessor 26 adjusts the profile vertically corresponding to that offset. (148) The microprocessor 26 stores the vertical adjustment as the deviation from the nominal nose height. (150) The actual height of the aircraft is the nominal nose height plus the deviation. Once it completes the height measuring phase 86, the microporocessor 26 returns to the tracking phase 84.

If the microprocessor 26 has already determined the nose height, it skips the height measuring phase 86 and determines whether the aircraft 12 has been identified. (130,132) If the aircraft 12 has been identified, the microprocessor 26 checks whether the aircraft 12 has reached the stop position. (134) If the stop position is reached the microprocessor 26 turns on the stop sign and the system 10 has completed the docking mode 64. (136) If the aircraft 12 has not reached the stop position, the micro-processor 26 returns to the tracking phase 84. (134)

If the aircraft 12 is not identified, the microprocessor 26 checks whether the aircraft 12 is less than or equal to 12 meters from the stopping position 53. (133) If the aircraft 12 not more than 12 meters from the stopping position 53, the system 10 turns on the stop sign to inform the pilot that identification has failed. (135) After displaying the stop sign, the system 10 shuts down.

Figure 10:
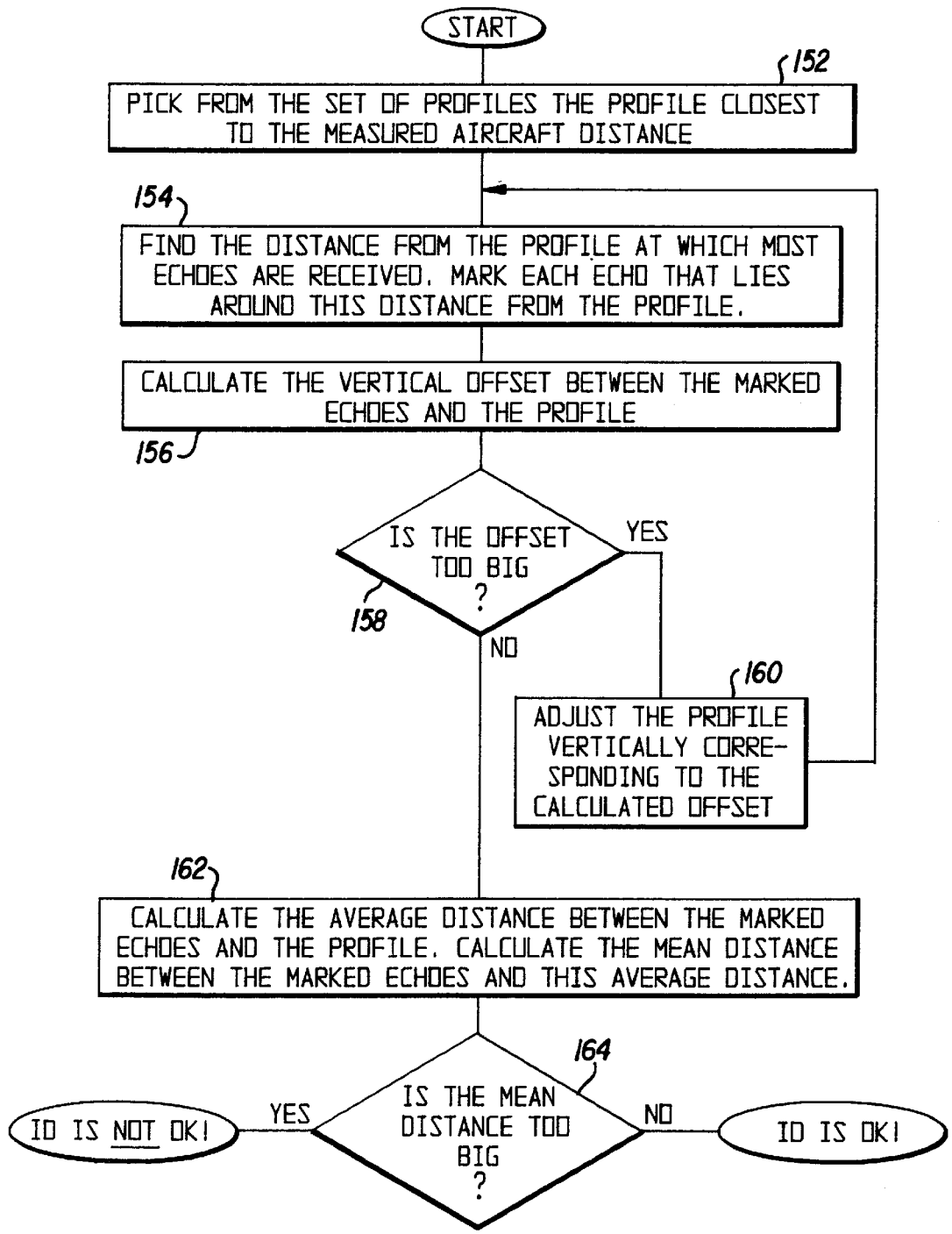
FIG. 10 is a flow chart illustrating the identification phase of the system.

If the aircraft 12 is more than 12 meters from the stopping point 53; the microprocessor 26 enters the identification phase ilustrated in Fig. 10. (133,88) In the identification phase 88, the microprocessor 26 creates a Comparison Table II to reflect the results of another vertical scan and the contents of the profile table. (152,154) Another vertical scan is performed in the identification phase 88 because the previous scan may have provided sufficient data for height determination but not enough for identification. In fact, several scans may need to be done before a positive identification can be made. After calculating the vertical offset 156, checking that it is not too large 158 and adjusting the profile vertically corresponding to the offset 160 until the offset drops below a given amount, preferably one, the microprocessor 26 calculates the average distance between marked echoes and the profile and the mean distance between the marked echoes and this average distance. (162)

The average distance $d_m$ between the measured and corrected profile and the deviation T from this average distance is calculated after vertical and horizontal scans as follows:

$$d_m = \Sigma d_i / N$$

$$T = \Sigma |d_i - d_m| \text{ in}$$

If T is less than a given value, preferably 5, for both profiles, the aircraft 12 is judged to be of the correct type provided that a sufficient number of echoes are received (164) Whether a sufficient number of echoes is received is based on:

$$N/\text{size} > 0.75$$

where N is the number of "accepted" echoes and "size" is the maximum number of values possible. If the aircraft 12 is not of the correct type, the microprocessor turns on the stop sign 136 and suspends the docking mode 64. Once the microprocessor 26 completes the identification phase 88, it returns to the tracking phase 84.

While the present invention has been described in connection with particular embodiments thereof, it will be understood by those skilled in the art that many changes may be made without departing from the true spirit and scope of the present invention as set forth in the following claims.

We claim:

1. A system for verifying the shape of a detected object comprising:

means for projecting light pulses in angular coordinates onto an object;

means for collecting light pulses reflected off said object and for determining the detected shape of said object;

means for comparing said detected shape with a profile corresponding to the shape of a known object and for determining whether said detected shape corresponds to said known shape;

means for directing said projected light pulses onto a calibration element positioned in a known angular direction and at a known distance from said means for directing said projected light for purposes of calibration of said system; and wherein the means for directing said projected light comprises a second mirror system.

2. The system of claim 1 wherein the light pulses are projected onto a mirror system with means for adjusting the mirror system to project the light pulses outwardly.

3. The system of claim 2 wherein said adjustable mirror system is operated by step motors under the control of a programmed microprocessor.

4. The system of claim 3 wherein:

the microprocessor totals the number of reflected pulses in each scan of said capture zone;

said microprocessor determines the largest sum of reflected pulses for three adjacent sectors; and said microprocessor determines that an object has been detected if the largest sum of reflected pulses for three adjacent sectors is at least a predetermined minimum number out of a total number of pulses projected within said three adjacent sectors and the number of reflected pulses in the three sectors with the largest sum is more than half of the total number of reflected pulses in the scan of said capture zone.

5. The system of claim 1 further including means for tracking an incoming object, said tracking means comprising: means for detecting the position of said incoming object relative to an imaginary axial line projecting from a predetermined point and for detecting the distance between said object and said predetermined point whereby tracking of the location of said object is enabled.

6. The system of claim 5 wherein:

a comparison table is generated containing information about collected light pulses and said information is compared with a profile table indicating the shape of known objects;

a distance distribution table is generated recording the distribution of distances from the object to said collection means for each collected light pulse; and an average distance is calculated from the detected position of said object to a desired stopping position for said object.

7. The system of claim 6 wherein the average distance to the stopping position is calculated by averaging the distance to said stopping position recorded for the entries in the comparison table corresponding to the two adjacent entries in the distance distribution table having the largest sum.

8. The system of claim 6 wherein the average stopping distance is communicated to a computer on board the aircraft allowing that computer to stop the aircraft when said aircraft reaches said stopping positions.

9. The system of claim 1 wherein:

said light pulses are reflected off said calibration element and are received at a detector;

determining a detected angular direction of the element relative to said light source based on said pulses received at said detector and in accordance with predetermined angular parameters; and comparing said detected angular direction with said known angular direction to determine whether said detected angular direction corresponds to said known angular direction.

10. The system of claim 9 further comprising:

means for adjusting the angular parameters if said detected angular direction and said known angular direction do not correspond so that the detected angular direction is caused to correspond essentially to the known angular direction.

11. The system of claim 9 further comprising:

means for determining the detected distance of said calibration element from said light source based on predetermined distance parameters; and comparing said detected distance with a known distance of said calibration element from said light source to determine whether said detected distance corresponds to said known distance.

12. The system of claim 9 further comprising:

means for adjusting the distance parameters if said detected distance and said known distance do not correspond so that the detected distance is caused to correspond essentially to the known distance.

13. The system of claim 1 wherein the angular direction and distance of said calibration means from said means for directing said projected light in a horizontal plane are calibrated while the angular direction and distance of said calibration means from said means for directing said projected light in a vertical plane are held constant.

14. A system for tracking an incoming object comprising:

means for generating light pulses;

means for projecting said pulses outwardly onto an incoming object and for reflecting said light pulses off said object;

means for collecting the light pulses reflected off of said object;

means for detecting the position relative to an imaginary axial line projecting from a predetermined point and for detecting the distance between said object and said predetermined point whereby tracking of the location of said object is enabled; wherein a comparison table is generated reflecting information about the laser scan and is compared with a profile table indicating the shape of known objects;

a distance distribution table is generated recording the distribution of distances from the nose of the object to the measuring device for each reflected pulse; and an average distance to a desired stopping position is calculated.

15. The tracking system of claim 14 wherein the average distance to the stopping position is calculated by averaging the distance to said stopping position recorded for the entries in the comparison table corresponding to the two adjacent entries in the distance distribution table having the largest sum.

16. The tracking system of claim 14 wherein a display shows the distance from the object to the stopping point, the type of object and the location of the object compared to center.

17. The tracking system of claim 14 wherein the average stopping distance is communicated to a computer on board the aircraft allowing that computer to stop the aircraft when said aircraft reaches said stopping position.

18. An aircraft identification and docking guidance system for verifying the shape of a detected aircraft comprising:

an adjustable, non-rotary mirror assembly including a first mirror for continuously projecting laser light pulses outwardly in horizontal planar angular coordinates onto an aircraft and a second mirror for continuously projecting laser light pulses outwardly in vertical planar angular coordinates onto said aircraft;

means for collecting light pulses reflected off said aircraft and for determining the detected shape of said aircraft; and means for comparing said detected shape with a profile corresponding to the shape of a known aircraft and for determining whether said detected shape corresponds to said known shape.

19. The system of claim 18 further including means for directing said projected light pulses onto a calibration element positioned in a known angular direction and at a known distance from said means for directing said projected light for purposes of calibration of said system.

20. The system of claim 19 wherein the means for directing said projected light comprises a second mirror system.

21. A method for verifying the shape of a detected object comprising:

projecting light pulses in angular coordinates onto an object;

reflecting said pulses back to a detector and determining the detected shape of the object based on said reflected pulses;

comparing said detected shape with a profile corresponding to the shape of a known object;

determining whether said detected shape corresponds to said known shape;

comparing said detected shape with a profile corresponding to the shape of a known object and for determining whether said detected shape corresponds to said known shape;

directing said projected light pulses onto a calibration element positioned in a known angular direction and at a known distance from said means for directing said projected light for purposes of calibration of said system; and wherein means for directing said projected light comprises a second mirror system.

22. The method of claim 21 wherein the profile corresponding to the shape of a known object comprises sets of expected reflected pulses at various distances from the stopping point.

23. The method of claim 21 wherein a microprocessor is programmed to identify an object.

* * * * *

UNITED STATES PATENT AND TRADEMARK OFFICE
CERTIFICATE OF CORRECTION

PATENT NO. : 6,023,665
DATED : February 8, 2000
INVENTOR(S) : Lars Millgard

It is certified that error appears in the above-identified patent and that said Letters Patent is hereby corrected as shown below:

Column 1,
Line 27, change "931/5416" to -- 93/15416 --.

Column 2,
Line 40, change "ate" to -- are --.

Column 5,
Line 54, change "die" to -- the --.

Column 10,
Line 23, change "$Y_t\text{-}=\sum d_i$" to -- $Y_1=\sum d_i$ --.
Line 31, change "32 kx $(Y_t\text{-}Y_2)/d^2$" to -- $a=kx(Y_1\text{-}Y_2)/d^2$ --.
Line 53, change "from" to -- From --.
Line 63, change "$S_m=a_m\text{-}a_m$" to -- $S_m=a_{m\text{-}1}\text{-}a_m$ --.

Column 11,
Line 1, change "$S_p=sm/P$" to -- $S_p=S_m/P$ --.

Column 12,
Line 22, change "$S_m=a_{m\text{-}1}\text{-}a_m$" to -- $s_m=a_{m\text{-}1}\text{-}a_m$ --.
Line 43, change "$Y_t\text{-}=\sum d_i$" to -- $Y_1=\sum d_i$ --.
Line 64, change "$\Delta\beta_i=\beta_s x(a_{m\beta}=a_s)/(a_\delta=a_s)$" to -- $\Delta\beta_i=\beta_s x(a_{m\beta}+a_s)/(a_j+a_s)$ --.

Column 13,
Line 49, change "$T\text{-}\sum |d_i\text{-}d_m|$ in" -- $T=\sum |d_i\text{-}d_m|/N$ --.

UNITED STATES PATENT AND TRADEMARK OFFICE
CERTIFICATE OF CORRECTION

PATENT NO. : 6,023,665
DATED : February 8, 2000
INVENTOR(S) : Lars Millgard

It is certified that error appears in the above-identified patent and that said Letters Patent is hereby corrected as shown below:

Column 14,
After line 2, insert the following two tables:

-- TABLE I

|    | 41 |    |     |
|----|----|----|-----|
| 42 ~ 78.25 | 78 | 77.5 ... | 23 |
| 44 ~ 5 | 5 | 5.6 ... | 10 |
| 45 ~ 1 | 2 | 3 ... | 50 |
| 0 | xx | xx | xx ... xx |
| 1 | xx | xx | xx ... xx |
| 2 | xx | xx | xx ... xx |
| 3 | xx | xx | xx ... xx |
| 4 | xx | xx | xx ... xx |
| 10 ~ 5 | xx | xx | xx ... xx |
| 6 | xx | xx | xx ... xx |
| 7 | xx | xx | xx ... xx |
| 8 | xx | xx | xx ... xx |
| 9 | xx | xx | xx ... xx |
| . | | | |
| . | | | |
| . | | | |
| 50 | xx | xx | xx ... xx |

43

UNITED STATES PATENT AND TRADEMARK OFFICE
CERTIFICATE OF CORRECTION

PATENT NO. : 6,023,665
DATED : February 8, 2000
INVENTOR(S) : Lars Millgard

It is certified that error appears in the above-identified patent and that said Letters Patent is hereby corrected as shown below:

TABLE II

| 91 $i$ | 92 $l_i$ | 93 $l_{ki}$ | 94 $d_i$ | 95 $a_i$ | 96 $a_c$ | 97 Note |
|---|---|---|---|---|---|---|
| 1 | xx | xx | xx | xx | xx | xx |
| 2 | xx | xx | xx | xx | xx | xx |
| 3 | xx | xx | xx | xx | xx | xx |
| 4 | xx | xx | xx | xx | xx | xx |
| 5 | xx | xx | xx | xx | xx | xx |
| 6 | xx | xx | xx | xx | xx | xx |
| . | | | | | | |
| 50 | xx | xx | xx | xx | xx | xx |
| . | | | | | | |
| 100 | xx | xx | xx | xx | xx | xx |

<u>Column 15,</u>
Line 23, before "comparing" insert -- means for --.

Signed and Sealed this

Nineteenth Day of February, 2002

Attest:

Attesting Officer

JAMES E. ROGAN
*Director of the United States Patent and Trademark Office*